United States Patent

Weller

[15] 3,675,135

[45] July 4, 1972

[54] SAMPLE-AND-HOLD CIRCUIT

[72] Inventor: David Reis Weller, Bernardsville, N.J.

[73] Assignee: Bell Telephone Laboratories, Incorporated, Murray Hill, N.J.

[22] Filed: July 27, 1970

[21] Appl. No.: 58,229

[52] U.S. Cl. ..............................328/151, 307/246, 307/238

[51] Int. Cl. ..............................H03k 17/56

[58] Field of Search ..............................328/151; 307/246, 238

[56] References Cited

UNITED STATES PATENTS

| | | | |
|---|---|---|---|
| 3,197,655 | 7/1965 | Wiseman | 328/151 |
| 3,363,113 | 1/1968 | Bedingfield | 328/151 |
| 2,697,782 | 12/1954 | Lawson | 328/151 |
| 2,621,263 | 12/1952 | Scoles | 328/151 |
| 3,470,482 | 9/1969 | Kolnowski | 307/246 |
| 3,471,719 | 10/1969 | Hughes | 307/246 |
| 3,419,736 | 12/1968 | Walsh | 307/246 |
| 3,064,208 | 11/1962 | Bullock et al. | 328/132 |

*Primary Examiner*—Donald D. Forrer
*Assistant Examiner*—Harold A. Dixon
*Attorney*—R. J. Guenther and William L. Keefauver

[57] ABSTRACT

A sample-and-hold circuit wherein the input signal to be sampled controls a current switch that supplies a linear charging current to a storage device in response to periodic sampling pulses. The storage device is completely discharged immediately preceding the taking of each sample.

5 Claims, 6 Drawing Figures

INVENTOR
D. R. WELLER
BY R.O. Nimtz
ATTORNEY

PATENTED JUL 4 1972 3,675,135

SHEET 2 OF 3

SAMPLE-AND-HOLD CIRCUIT

BACKGROUND OF THE INVENTION

1. Field of the Invention

The present invention relates to sample-and-hold circuits, and more particularly, to sample-and-hold circuits that accurately sample an input signal with minimal loading of the input circuit.

2. Description of the Prior Art

Sample-and-hold circuits presently find extensive application in the electronics art. For example, it is becoming increasingly common to handle data in digital rather than analog form. This requires means for converting the data back and forth between the two forms as well as means for using digital signals to represent analog signals. The sample-and-hold function is commonly used in constructing these types of apparatus.

Another example of the utility of sample-and-hold circuitry is the area of digital feedback systems. These systems, commonly termed sampled-data control systems, are coming into increased use as their advantages of economical use of equipment, light weight, and ability to handle a wide variety of compensation procedures, become better appreciated by system designers. As the name implies, apparatus for sampling an analog signal lies at the heart of these systems. Indeed, analytical techniques uniquely suited to such systems have been developed, as, for example, the z-transform theory of the text Sampled-Data Control Systems by Eliahu I. Jury, John Wiley & Sons, Inc., 1958.

The extent to which sampled data techniques are used depends to a large extent on the ability of sample-and-hold circuitry to fit system design criteria such as accuracy and total hardware compatibility. The need for circuitry that can accurately portray an input signal while not loading down the input is obvious. The requirement of hardware compatibility, while often not as critical as accuracy requirements, is important since it eliminates the extra expense and complexity involved in meshing the various system components. The systems described above typically use digital circuitry, such as transistor-transistor logic (TTL), requiring low signal and bias levels. Most prior art sample-and-hold circuits, including those using field effect transistors, are not compatible with TTL logic levels.

Accordingly, it is an object of this invention to provide a sample-and-hold circuit that is compatible with TTL signal levels.

It is also an object of this invention to provide a circuit that can accurately sample an input signal and hold the sample level for a particular time period.

It is a further object of this invention to provide a sample-and-hold circuit that combines sampling accuracy with minimal loading of the input circuit.

It is a still further object of this invention to provide a sample-and-hold circuit in which the output signal may have a larger dynamic range than the input signal.

SUMMARY OF THE INVENTION

These objects are achieved in accordance with this invention by applying sampling pulses through an open-collector inverter to a capacitor that comprises the means for holding the output signal. This allows the capacitor to discharge completely during the time that each sample pulse is present. The trailing edge of each sample pulse is used to trigger a monostable multivibrator. The output of this multivibrator allows current to flow into the emitter of a transistor that is part of a single-stage current amplifier. The input signal to be sampled is applied to the base of this transistor and the collector of the transistor is connected to the output capacitor. The current flow from the emitter to the collector is linearly dependent upon the input signal and serves to charge the output capacitor during the time period of each output pulse from the multivibrator. Discharging the output capacitor immediately preceding the taking of each sample and recharging it by a linear charging current rather than directly by the input signal produces a very accurate sample-and-hold process that does not load down the input signal. This indirect charging also allows simultaneous amplification to be performed, thereby giving the output a greater dynamic range than the input.

DETAILED DESCRIPTION

Figure 1:
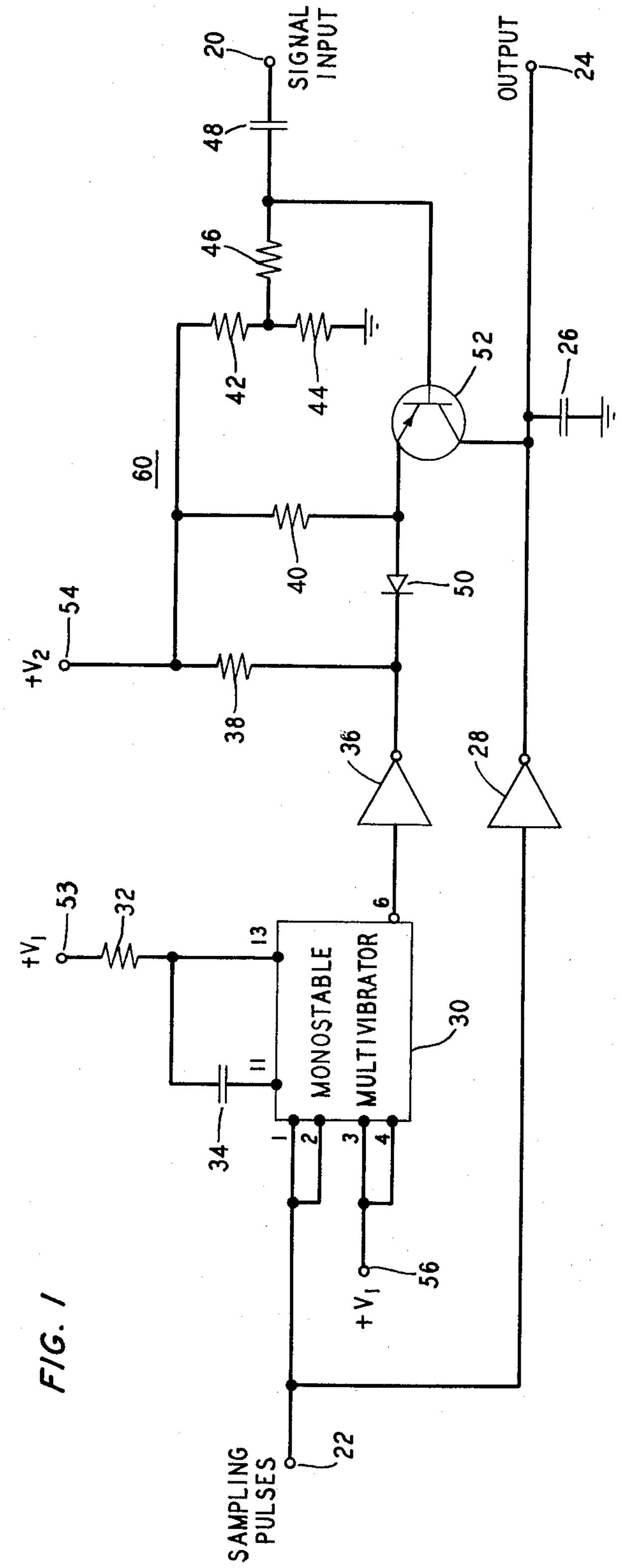
FIG. 1 shows an embodiment of the circuit comprising the instant invention.

FIG. 1 shows a detailed embodiment of this invention. The signal to be sampled is applied at terminal 20. Sampling pulses are applied at terminal 22. The output signal is obtained at terminal 24. Supply voltage $V_1$ is applied to terminals 53 and 56, and supply voltage $V_2$ is applied to terminal 54.

Figure 2:
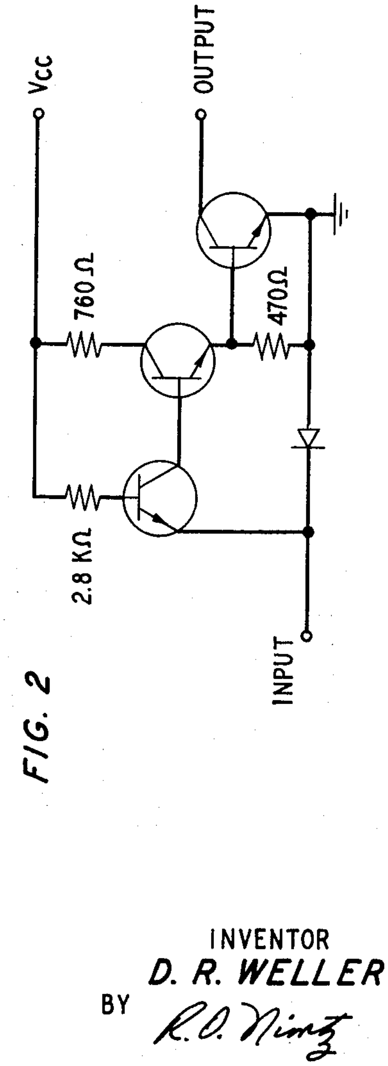
FIG. 2 is a detailed schematic diagram of an inverter suitable for use in the circuit of FIG. 1.

Immediately preceding each new sample pulse, the circuit is in a quiescent state with capacitor 26 holding the value of the last sample. The leading edge of each sample pulse causes open-collector inverter 28 to go to ground. Open-collector inverter 28 remains at ground during the entire width of the sample pulse thereby allowing capacitor 26 to completely discharge. Open-collector inverter 28 and open-collector inverter 36, which is to be described, are of a type well known in the prior art. A specific example of an inverter suitable for use with this invention is the SN74H05 Hex Inverter, which may be obtained from Texas Instruments, Inc., and which is shown schematically in FIG. 2.

Figure 3:
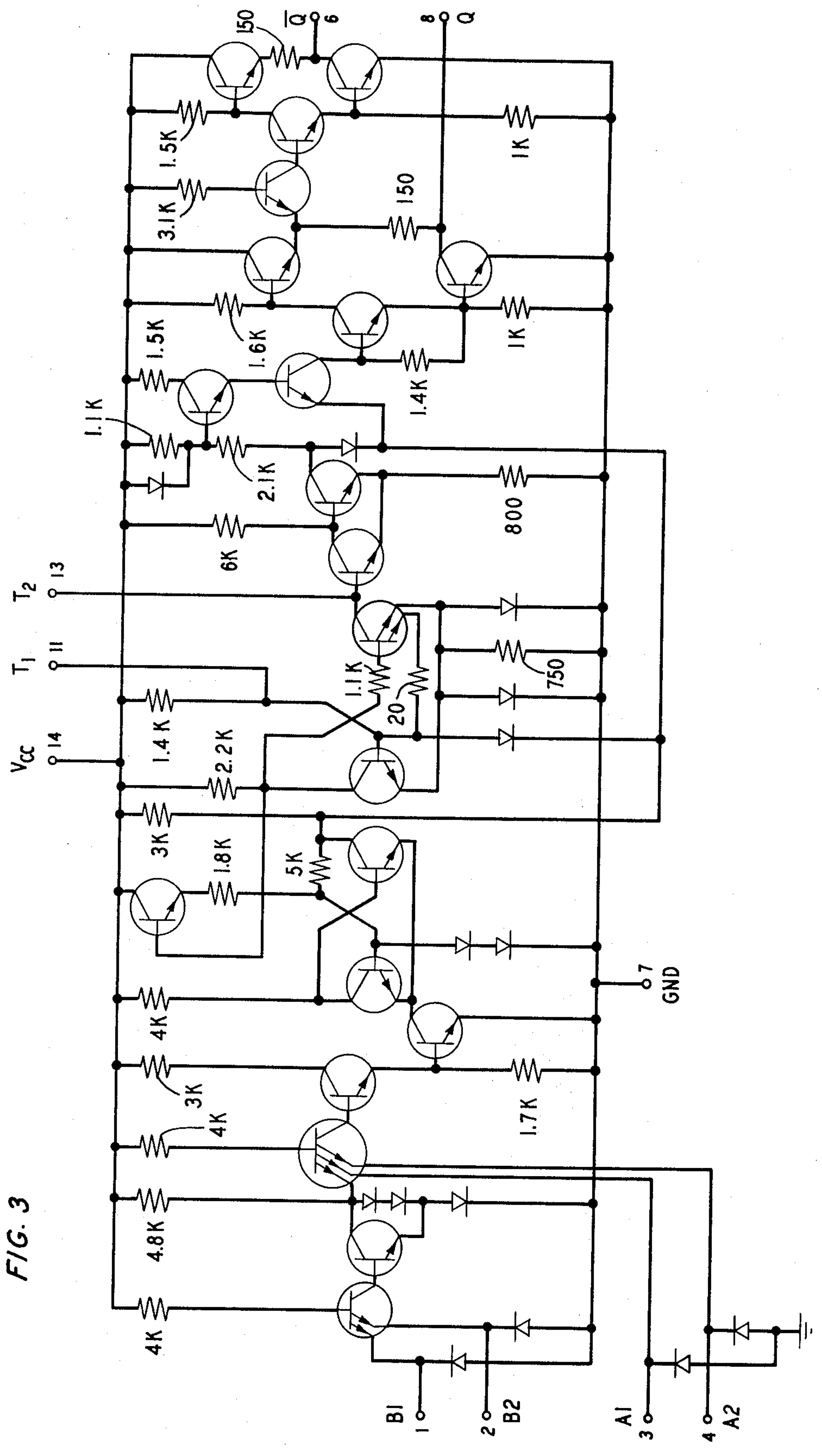
FIG. 3 is a detailed schematic diagram of a monostable multivibrator suitable for use in the circuit of FIG. 1.

The trailing edge of each sample pulse applied to terminal 22 serves to trigger monostable multivibrator 30. The duration of the output pulse from multivibrator 30 is determined by the RC time constant provided by resistor 32 and capacitor 34. The multivibrator 30 is of a type well known in the prior art. A specific example of a suitable multivibrator is the Fairchild 9601 Retriggerable Monostable Multivibrator which may be obtained from Fairchild Semiconductor, Inc., and which is shown schematically in FIG. 3. The terminal numbers of multivibrator 30 shown in FIG. 1 correspond exactly to the terminal numbers shown in FIG. 3.

The pulse train appearing at terminal 6 of multivibrator 30 in FIG. 1 comprises pulses varying between a positive voltage and ground. This pulse train is applied to open-collector inverter 36 and serves to control the action of the linear current switch 60 which is comprised of resistors 38, 40, 42, 44 and 46 along with capacitor 48, diode 50 and transistor 52.

The magnitude of the current passed through linear current switch 60 is determined by the input signal appearing at terminal 20. The closure time of switch 60 is determined by the width of the output pulse from the multivibrator 30.

The switch 60 is off when no pulse is present at the output of multivibrator 30 because the output of open-collector inverter 36 is essentially at ground causing all current from source $V_2$ at terminal 54 to flow through resistors 38 and 40 to ground. The voltage appearing on the emitter of transistor 52 is then the drop, approximately one volt, across diode 50, this serves to back-bias the transistor and keep it cut-off.

The switch 60 is on when a pulse is present at the output of multivibrator 30 because current from source $V_2$ at terminal 54 flows to the emitter of transistor 52 through resistor 40. Current does not flow through diode 50 when the switch is on because open-collector inverter 36 is at $+V_2$ volts.

Resistors 42 and 44 form a voltage divider which determines the dynamic range of the output signal. The voltage appearing across resistor 44 must be related to the voltage $V_2$ in such a manner as to provide the proper emitter-to-base voltage needed to achieve the desired relationship between the input and output signals. That is, it must be chosen to keep transistor 52 out of saturation at the lowest value of the input signal in order to insure linear current flow from emitter to collector. Resistor 46 and capacitor 48 serve to couple the input signal appearing at terminal 20 into the base of transistor 52.

Figure 4A:
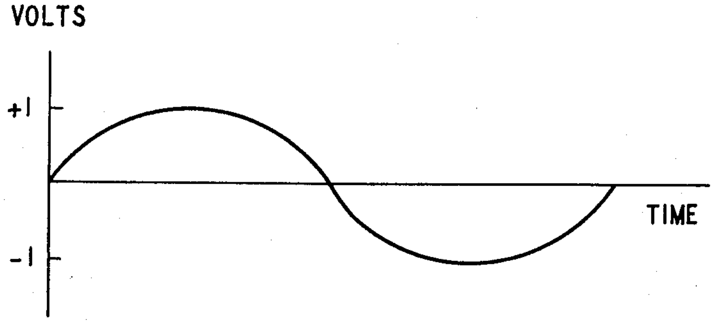
FIGS. 4A and 4B illustrate the output waveform produced by the circuit of FIG. 1.
Figure 4B:
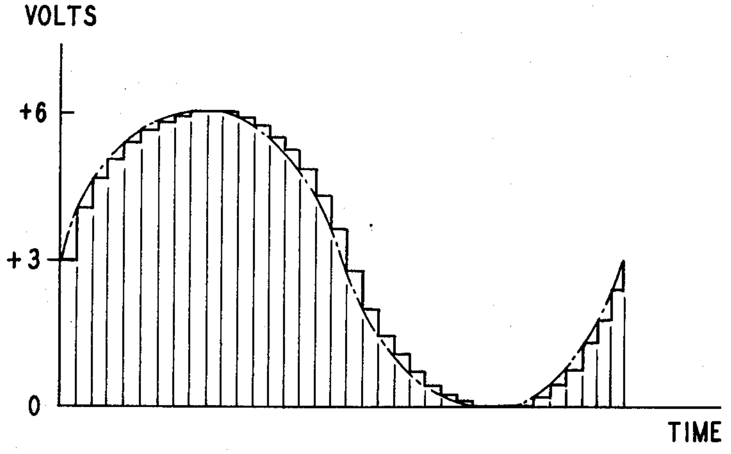

FIG. 4A shows an exemplary input signal that might be applied to terminal 20 of FIG. 1, and FIG. 4B shows the output that would result at terminal 24. The operation of the circuit of FIG. 1 can thus be seen in this example to effect a translation of the input signal to a positive waveform, and an expansion of the range of the signal values from 2 volts to 6 volts.

Figure 5:
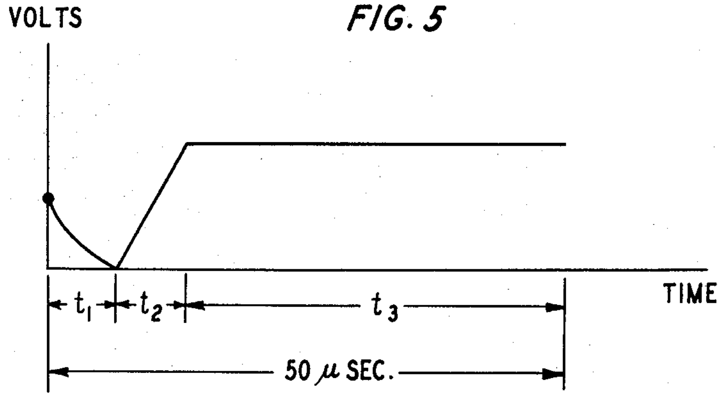
FIG. 5 is an expanded view of a portion of FIG. 4B.

FIG. 5 shows an expanded-scale view of one of the sampling points shown in FIG. 4B. The sampling pulse train may be assumed, for exemplary purposes, to comprise 150 nanosecond pulses at a 20 kilohertz rate. The time allowed for capacitor 26 to discharge, shown as $t_1$ in FIG. 5, will then be 150 nanoseconds. The charging time available to capacitor 26, which is shown as $t_2$ in FIG. 5, will be equivalent to the pulse width of the output pulses from multivibrator 30 shown in FIG. 1, and may be considered in this example to be 250 nanoseconds. The hold time of capacitor 26, shown as $t_3$ in FIG. 5, would thus be 49.6 microseconds. Time periods $t_1$ and $t_2$, shown in FIG. 5, clearly illustrate the complete discharge and linear recharge of capacitor 26 which is a characteristic of this invention, and which results in a very accurate sample-and-hold process. The use of the linear current switch 60 to charge capacitor 26 rather than using the input signal to charge it directly also prevents undesired loading of the input signal.

Table 1 is a complete list of component and voltage values that may be used to practice this invention.

TABLE I

| Component | Value |
|---|---|
| Capacitor **26** | 1000 pf |
| Inverter **28** | SN74H05 Hex Inverter |
| Multivibrator **30** | Fairchild 9601 |
| Resistor **32** | 4.7 K |
| Capacitor **34** | 330 pf |
| Inverter **36** | SN74H05 Hex Inverter |
| Resistor **38** | 1 K |
| Resistor **40** | 220 ohms |
| Resistor **42** | 1.8 K |
| Resistor **44** | 6.8 K |
| Resistor **46** | 4.7 K |
| Capacitor **48** | 10 $\mu$f |
| Diode **50** | IN4606 |
| Transistor **52** | 2N4250 |

| Voltage | Value |
|---|---|
| $V_1$ | +5 volts |
| $V_2$ | +9 volts |
| Signal Input | ±1 volt |
| Output | 0 to +6 volts |
| Sampling Rate | 20 KHz |
| Sample Pulse Width | 150 nsec. |

This table comprises an exemplary embodiment of the invention in accordance with the above disclosure and discussion. It will be understood that this embodiment may be subject to various changes, modifications, and substitutions in ways well known to those skilled in the art without departing from the spirit and scope of this invention.

I claim:

1. A circuit for sampling and holding an input signal in response to periodic sampling pulses comprising:
   means for generating a constant current having a magnitude that is linearly dependent upon the instantaneous magnitude of said input signal;
   a capacitor connected to said current generating means;
   means responsive to the trailing edges of said periodic sampling pulses for generating control pulses;
   means for activating said current generating means only during the pulse width of said control pulses, thereby linearly charging said capacitor to a value that is linearly proportional to the instantaneous magnitude of said input signal; and
   means responsive to each of said periodic sampling pulses for discharging said capacitor during the pulse width of said periodic sampling pulses, whereby said capacitor is completely discharged before each new value to be stored is applied thereto.

2. A circuit for sampling and holding an input signal in response to periodic sampling pulses comprising:
   means for holding a sampled value;
   means for applying a constant current to said holding means in response to each one of said periodic sampling pulses, the magnitude of the constant current in each case being linearly dependent upon the instantaneous magnitude of said input signal; and
   means for completely discharging said holding means before each new value to be held is applied thereto.

3. The circuit of claim 2 wherein said means for holding a sampled value comprises a capacitor.

4. An improved method of sampling and holding an input signal in response to periodic sampling pulses wherein the improvement comprises the step of using a particular value of constant current to charge said holding means in response to each of said periodic sampling pulses, where the magnitude of the particular constant current used in each case is linearly dependent upon the instantaneous magnitude of said input signal.

5. The method of claim 4 further including the step of completely discharging said holding means prior to each time said holding means is charged.

* * * * *